(12) United States Patent
Amthor et al.

(10) Patent No.: US 11,579,429 B2
(45) Date of Patent: Feb. 14, 2023

(54) METHOD, COMPUTER PROGRAM AND MICROSCOPE SYSTEM FOR PROCESSING MICROSCOPE IMAGES

(71) Applicant: Carl Zeiss Microscopy GmbH, Jena (DE)

(72) Inventors: Manuel Amthor, Jena (DE); Daniel Haase, Zöllnitz (DE); Markus Sticker, Jena (DE)

(73) Assignee: Carl Zeiss Microscopy GmbH, Jena (DE)

( * ) Notice: Subject to any disclaimer, the term of this patent is extended or adjusted under 35 U.S.C. 154(b) by 16 days.

(21) Appl. No.: 17/316,808

(22) Filed: May 11, 2021

(65) Prior Publication Data

US 2021/0356729 A1 Nov. 18, 2021

(30) Foreign Application Priority Data

May 15, 2020 (DE) .................... 10 2020 113 313.8

(51) Int. Cl.
| | |
|---|---|
| *G02B 21/36* | (2006.01) |
| *G06N 20/00* | (2019.01) |
| *G06N 3/04* | (2023.01) |
| *G06T 7/00* | (2017.01) |
| *G06K 9/62* | (2022.01) |

(52) U.S. Cl.
CPC ......... *G02B 21/367* (2013.01); *G06K 9/6262* (2013.01); *G06N 3/04* (2013.01); *G06N 20/00* (2019.01); *G06T 7/0012* (2013.01); *G06T 2207/10056* (2013.01); *G06T 2207/20084* (2013.01)

(58) Field of Classification Search
CPC ........ G02B 21/367; G06N 20/00; G06N 3/04; G06K 9/6262; G06T 7/0012; G06T 2207/10056; G06T 2207/20084
USPC ......................................................... 348/79
See application file for complete search history.

(56) References Cited

U.S. PATENT DOCUMENTS

| | | | |
|---|---|---|---|
| 2011/0170009 A1* | 7/2011 | Uemura ............... | G09G 3/3611 348/E9.055 |
| 2017/0085789 A1* | 3/2017 | Tatsuta .................. | G02B 21/06 |

OTHER PUBLICATIONS

Wickborn, Search Report for DE102020113313.8, dated Dec. 16, 2020, 7 pages (English translation not available).
Nie, Dong et al., "Medical Image Synthesis with Context-Aware Generative Adversarial Networks," International conference on medical image computing and computer-assisted intervention, Dec. 16, 2016, 12 pages.

(Continued)

*Primary Examiner* — Allen C Wong
(74) *Attorney, Agent, or Firm* — LaBatt, LLC

(57) ABSTRACT

In a method for processing microscope images, at least one microscope image is provided as input image for an image processing algorithm. An output image is created from the input image by means of the image processing algorithm. The creation of the output image comprises adding low-frequency components for representing solidity of image structures of the input image to the input image, wherein the low-frequency components at least depend on high-frequency components of these image structures and wherein high-frequency components are defined by a higher spatial frequency than low-frequency components. A corresponding computer program and microscope system are likewise described.

14 Claims, 5 Drawing Sheets

(56) References Cited

OTHER PUBLICATIONS

Tian, Lei and Laura Waller, "Quantitative differential phase contrast imaging in an LED array microscope," Optics Express, vol. 23, No. 9, 2015, 10 pages.
Murphy, D.B. et al, "Comparison of Phase Content and DIC Microscopy," Molecular Expressions™ Optical Microscopy Primer Specialized Techniques, Jul. 23, 2019, 13 pages.
Yi, Xin et al, "Generative Adversarial Netowrk in Medical Imaging: A Review," Medical Image Analysis, Aug. 2019, 25 pages.
Ounkomol, Chawin et al., "Label-free prediction of three-dimensional fluorescence images from transmitted light microscopy," bioRxiv 289504; doi: https://doi.org/10.1101/289504, May 23, 2018, 25 pages.
Wang, Hongda et al., "Deep learning achieves super-resolution in fluorescence microscopy," bioRxiv 309641; doi: https://doi.org/10.1101/309641, Apr. 27, 2018, 29 pages.

\* cited by examiner

METHOD, COMPUTER PROGRAM AND MICROSCOPE SYSTEM FOR PROCESSING MICROSCOPE IMAGES

REFERENCE TO RELATED APPLICATIONS

The current application claims the benefit of German Patent Application No. 10 2020 113 313.8, filed on 15 May 2020, which is hereby incorporated by reference.

FIELD OF THE DISCLOSURE

The present disclosure relates to a method, a computer program and a microscope system for processing microscope images, in particular contrast images, which are recorded using a light microscope.

BACKGROUND OF THE DISCLOSURE

Phase objects do not exhibit significant absorption differences in respect of incident light but influence the phase of light passing through. Various contrast methods are known for converting phase differences generated by such samples into brightness differences in a recorded microscope image. An established process is the recording of differential interference contrast images (DIC images). A solid impression is caused therein, i.e., objects in a two-dimensional image appear to have a depth or height. This helps a user with the visual assessment or evaluation of the microscope image, which is one of the reasons for the widespread use of the DIC technique. However, the operation of a DIC microscope is demanding, the required components are comparatively expensive and a combination with other measurement techniques, for example fluorescence image recording, may only be possible to a restricted extent.

Advantages in comparison with the DIC technique are offered by differential phase contrast (DPC), as described in "Quantitative differential phase contrast", Tian et al, Optics Express, 2015, Vol. 23, No. 9. A phase image can be reconstructed by processing two DPC images with mutually perpendicular gradient directions. All that is required for being able to calculate a DPC image is two recordings with opposing half pupil-shaped illuminations. As a rule, further settings of other components are not required. However, the DPC method is disadvantageous in that the DPC contrast cannot measure small phase gradients of the sample as a result of the condenser (a typical NA of a condenser at a large working distance is approximately 0.55) in the case of an objective aperture that is greater than the illumination aperture. The microscope image generated thus loses solidity, which makes the optical assessment by a user more difficult in the case of, e.g., cells. However, in order to be able to present a usual image to the user, as they may know from DIC methods, for example, the invention should be able to generate this solid image impression from the measured images. For improved understanding, reference is made to FIG. 1 which shows a DPC-like image and a DIC-like image, which evokes a better spatial impression than the DPC-like image.

In principle, changes to the apparatus would be conceivable; by way of example, a situation that can also measure small phase gradients could be re-established by restricting the objective aperture to the illumination aperture. However, this restricts the resolution. Moreover, the detection efficiency of a fluorescence recording with the same optical arrangement is reduced as a result of the restrictive objective aperture.

Therefore, the present disclosure concentrates on calculation methods for improving the quality of recorded microscope images. In generic methods for processing microscope images, at least one microscope image is input as input image into an image processing algorithm. An output image is created from the input image by the image processing algorithm. Accordingly, a generic microscope system comprises a microscope for recording a microscope image and a computing device which is set up to carry out an image processing algorithm, wherein the image processing algorithm creates an output image from the microscope image as input image.

By way of example, such a method is described in: "Label-free prediction of three-dimensional fluorescence images from transmitted light microscopy", Chawin Ounkomol et al., bioRxiv 289504; doi: https://doi.org/10.1101/289504. Here, use is made of a machine learning algorithm based on a CNN (convolutional neural network), for example to estimate a fluorescence image as an output image from a recorded transmitted light image as an input image. Moreover, a similar method is known from: "Deep learning achieves super-resolution in fluorescence microscopy", Hongda Wang et al., bioRxiv 309641; doi: https://doi.org/10.1101/309641. Here, a machine learning algorithm is trained on the basis of a generative adversarial network (GAN) in order to subsequently be able to calculate an output image, a super resolution fluorescence image in this case. In this case, a comparatively low-resolution image is used as input image, in particular a wide-field fluorescence image or diffraction-limited confocal image. Consequently, higher quality images are produced qualitatively in the aforementioned machine learning algorithms by virtue of resorting to taught relationships in respect of how image structures look like in super resolution reference images. Thus, the machine learning algorithms are trained to complement a low-resolution image with details not contained in the input image. In the process, it is not possible to exclude the case that image structures are "hallucinated" in the output image or are invented therein.

However, in general, there is a need for evaluating recorded microscope images by means of image processing algorithms without there being a higher risk of falsifying the sample structure image representations. An exemplary application relates to the DPC images mentioned above in relation to FIG. 1.

SUMMARY OF THE DISCLOSURE

An object of the invention can be considered that of specifying a method, a computer program and a microscope system for processing microscope images, which improve an image representation, where possible without the risk of falsifying the illustrated image structures.

This object is achieved by the method of claim 1, the computer program of claim 13 and the microscope system of claim 14.

A method for processing microscope images comprises, according to an aspect of the invention, inputting at least one microscope image as input image into an image processing algorithm; creating an output image from the input image by means of the image processing algorithm; wherein the creation of the output image comprises adding low-frequency components for representing solidity (three-dimensionality) of image structures of the input image to the input image, wherein the low-frequency components at least depend on high-frequency components of these image structures and wherein high-frequency components are defined by a higher spatial frequency than low-frequency components.

A microscope system according to an aspect of the invention comprises a microscope for recording a microscope image and a computing device configured to carry out an image processing algorithm. The image processing algorithm creates an output image from the microscope image as input image, wherein the creation of the output image comprises adding, to the input image, low-frequency components for representing solidity of image structures of the input image, wherein the low-frequency components at least depend on high-frequency components of these image structures and wherein high-frequency components are defined by a higher spatial frequency than low-frequency components The computer program according to the invention comprises commands which, upon execution by a computer, prompt the method according to the invention to be carried out.

Higher frequency image components substantially carry the information of edges and positions of the objects in the microscope image. Therefore, no higher frequency image components or hardly any higher frequency image components are added to the input image so as not to falsify this information. Rather, it is precisely the low-frequency components that aid a solid impression and which may be suppressed or are completely lacking in the microscope image as a result of certain recording techniques, for example the differential phase contrast (DPC) mentioned at the outset. Therefore, an improved spatial impression can be achieved without new objects or new object edges being erroneously added by virtue of the added image components being substantially restricted to low spatial frequencies.

Optional Designs

Variants of the implementations according to the invention are the subject of the dependent claims and will be discussed in the following description.

Spatial Frequency Upper Limit

The image processing algorithm can be designed to define a spatial frequency upper limit depending on an image content or frequency distribution of the input image. Therefore, this upper limit is not rigid but a variable frequency limit, which depends on the respective input image. The image processing algorithm now only adds low-frequency components that lie below the spatial frequency upper limit to the input image. This ensures that a frequency interval of the added low-frequency components is adapted to the respective input image. The spatial frequency upper limit can be expressed by an exact frequency value or by a drop over a frequency range. The drop can describe that an amplitude of added low-frequency components becomes smaller with increasing frequency.

Producing Low-Frequency Information not Already Present in the Input Image

To be clear, reference is made to the fact that, in contrast to known low-pass filters as are conventional in image processing, new low-frequency information is generated and it is not only the case that there is amplification of low-frequency components already present in the microscope image. Thus, the low-frequency components complemented by a low-pass filter only are an amplification of low-frequency components already present in the input image, which are calculated independently of high-frequency components. Even if a gain factor of low-frequency components already present is not described by a constant factor but instead described by, e.g., a monotonic frequency-dependent function in a low-pass filter, this would not achieve the objects of the invention of representing solidity of image structures.

In contrast thereto, the image processing algorithm of invention variants can be designed in such a way that it adds the low-frequency components to the input image, with the added low-frequency components not representing an amplification or multiplication of low-frequency components already present in the input image. Since the low spatial frequencies are often lacking as a result of the optical recording technique, an amplification/multiplication would not be effective either. Therefore, the added new low-frequency components are not, or not only, calculated from available low-frequency components of the input image but are calculated on the basis of image structures represented by the high-frequency components.

Context Information

Additionally, the low-frequency components to be added can also be defined on the basis of context information relating to the microscope image. By way of example, the context information can relate to microscope parameters which were used when recording the respective microscope image. Microscope parameters can provide information about what frequency range is lacking from the microscope image such that the low-frequency components or the spatial frequency upper limit are defined in accordance with the lacking frequency range. By way of example, a microscope parameter might be an aperture (illumination aperture or objective aperture) with which a microscope image was recorded.

In the case of the following variants with machine learning algorithms, context information can also be stored with training data and can be considered when training the machine learning algorithm. If the machine learning algorithm has learned an image-to-image mapping with the context information for training data, the input data of the image processing algorithm optionally also comprise context information in addition to the actual microscope image.

In addition or as an alternative to microscope parameters, context information can also relate to image contents. By way of example, context information can denote the type and/or the relative position of the imaged sample(s) and/or a sample vessel. The context information can be specified or initially ascertained from the input image with the aid of a context information machine learning algorithm. By way of example, a segmentation mask can be output as context information, said segmentation mask specifying the relative position and size of a plurality of samples (e.g., biological cells) or of a plurality of sample components in the input image. Such context information can be helpful so that it is possible to add those low-frequency components which particularly aptly generate a solid (i.e., spatial/three-dimensional) impression.

Image Processing Using a Machine Learning Algorithm

Optionally, the image processing algorithm can comprise a machine learning algorithm which is trained to add the low-frequency components to the input image.

The machine learning algorithm can be trained, in particular by way of supervised learning, wherein use is made of microscope images as input images and target images spatially registered to the microscope images. Locally registered should be understood to mean that the same sample was recorded in a microscope image and in a target image spatially corresponding therewith. In particular, the target images can be differential interference contrast images (DIC images), or expressed more generally, images depending on DIC data, e.g., further processed DIC raw images or a difference image made from a DIC image and an input image. The input images or microscope images of the training data can be contrast images, in particular, in which phase information was converted into brightness information. In this way, a DIC-like image can be calculated without requiring specific DIC hardware.

The machine learning algorithm can comprise a neural network, in particular with an encoder-decoder structure. The decoder ascertains the low-frequency components that are provided for, in particular added to, the input image.

In contrast to known uses of machine learning algorithms for processing microscope images, the determination of the low-frequency components according to the invention can be implemented, in particular, with the aid of a specific loss function when training the machine learning algorithm. A loss function can also be referred to as cost function or reward function. During the training of a machine learning algorithm, input images are mapped to output images with the aid of parameters (weight), the exact values of which should be ascertained during the learning process. Target/reference images can be stored for the input images. The loss function now specifies a deviation between an output image, as calculated from an input image using the current (not yet fully trained) parameters, and an associated specified target/reference image. Accordingly, a loss function can award or represent more penalty points, the greater the deviation is between the current output image and the specified target image. Depending on the penalty points output by the loss function, an optimization function can subsequently ascertain a gradient for altered parameters/weights, by means of which an output image is calculated in turn from the input image. This process is repeated iteratively. In contrast to conventional loss functions, the invention can comprise a loss function which not only considers a deviation between output images calculated from training data and associated target images. Rather, the loss function additionally penalizes or prevents an addition of spatial frequency components with increasing spatial frequency or above a spatial frequency limit. If an output image has a very good correspondence with the associated specified target image with, however, this output image differing from the associated input image in terms of higher-frequency image components, the loss function outputs a high penalty value. As a consequence of this specific loss function, the machine learning algorithm can be trained in such a way that it calculates an output image from an input image, the difference of which from the associated specified target image is minimized without being complemented by higher-frequency image components or with higher-frequency image components only being complemented to a reduced extent.

By way of example, a frequency-dependent expression of the loss function can be ascertained as follows: Initially, a difference image is calculated from an FFT (Fourier transform) of an input image and an FFT of an output image. This difference image specifies the amplitudes of the various frequencies which were added to the input image in order to produce the output image. The relative position of a pixel in the difference image corresponds to its spatial frequency and the pixel value specifies the amplitude of this spatial frequency. A horizontal axis and a vertical axis (which both typically pass through the centre of the difference image) specify the zero frequencies in the horizontal and vertical direction, respectively. The further a pixel is from the image centre, the higher its frequency. The frequency-dependent expression of the loss function may now depend on, for example, the distance of each pixel from the image centre, with each of these distance values being weighted by the pixel value (i.e., the brightness value). The distances of all pixels from the image centre weighted thus are added or combined (aggregated) in any other way. The magnitude of such an expression becomes ever larger, the higher the frequency of the image component added to the input image. In a development of this embodiment, a distance to the closest horizontal or vertical axis (which has a vertical or horizontal frequency of zero) can also be used instead of a distance of a pixel from the image centre. Within the meaning of this disclosure, the specified distances in the frequency space can be considered as the frequencies of the low-frequency component to be added. Any other distance measure characterizing the frequency can also be used.

Optionally, the aforementioned spatial frequency limit or a spatial frequency dependence of the aforementioned addition of spatial frequency components dependent on the image content of the input image can be defined in the loss function. A spatial frequency limit above which the loss function outputs penalty points is consequently not the same for all input images; instead, it is ascertained from (or on the basis of) the image content of the respective input image. Context information relating to the respective input image can also be included in the level of parameters of the loss function (e.g., for choosing the spatial frequency limit).

Instead of a specific loss function which penalizes an addition of higher-frequency image components, it is also possible to use specific training data in the training procedure: By way of example, it is possible to use prepared target images, in which it was ensured that they do not differ from the associated input images by image frequencies above a specified limit.

Image Processing with a Verification Algorithm

A verification algorithm can be complemented, both in variants with a machine learning algorithm and in the case of the conventional design of the image processing algorithm without machine learning components. The image processing algorithm produces the output image in a first work step and the output image is supplied to and assessed by a verification algorithm in a second work step.

The verification algorithm is designed to assess the output image in respect of image processing artefacts, which could have arisen within the scope of adding the low-frequency components.

Depending on an assessment result, the first work step can optionally be repeated for producing a new output image, with the stipulation that the spatial frequency limit or the spatial frequency upper limit is reduced to a lower frequency value. A plurality of sets of weights of the neural network of the machine learning algorithm may have also been learned in advance, wherein these different sets of weights have been ascertained by different loss functions. Different loss functions can differ in the extent to which higher frequency components (in particular with increasing frequency or above the spatial frequency limit) are penalized. If the verification algorithm has now detected image processing artefacts, it is possible to use a set of weights ascertained with stronger penalties for higher frequency components when carrying out the image processing again. This reduces the probability of image processing artefacts occurring again.

If the verification algorithm subsequently determines image processing artefacts even in the new output image, the aforementioned steps can be carried out again. Only once the assessment result specifies that no image processing artefacts are present is the output image used, stored or output to a user for further processing.

The verification algorithm can also be designed to carry out an analysis and assessment of the arising frequency domain of the output image relative to the frequency domain of the associated input image. In some variants, the verification algorithm compares the output image to the input image and assesses whether the added low-frequency components observe a specified frequency upper limit. The frequency upper limit can be the aforementioned spatial frequency upper limit.

The verification algorithm can also comprise a machine learning verification algorithm. In particular, the latter might have been trained using training data that comprise the already mentioned microscope images as input images and the associated output images calculated by the image processing algorithm as target images. Here, it may also have been ensured in advance that the target images used in the training data are free from image artefacts. The machine learning verification algorithm can also undertake the assessment in the frequency domain in analogous fashion: Instead of the microscope images and the output images, the corresponding frequency transformations, e.g., Fourier transforms, are then used during training.

General Properties

The microscope image used as input image can be a contrast image, in particular, in which phase information of an examined object is represented by a brightness value. By way of example, this can be a DPC image, a phase contrast image, a DIC image, a Hoffman modulation contrast image or a Dodt contrast image, which is recorded by means of specific adjustment of an illumination stop. More generally, this could in principle be any image recorded by a light microscope or any other microscope.

The image processing algorithm can be understood to mean a program which is executable on a computing device and which calculates an output image from an input image. The program can be written completely in software or else at least partly in hardware. In principle, the input images and/or output images can also be available in the frequency domain.

The frequency domain of an image can be calculated from an image, for example by a Fourier transform, in particular a discrete Fourier transform. In the frequency domain, the image is represented by different frequency components/spatial frequencies (e.g., cosine waves or sawtooth waves) with respective amplitude and optionally phase. All aforementioned frequencies are spatial frequencies and not, for instance, temporal frequencies.

Accordingly, low-frequency components or components of low frequency relate to the spatial frequency. It is possible to add the low-frequency components to the input image for example following the conversion of the input image into the frequency domain, or by virtue of the low-frequency components initially being transformed into the spatial domain and subsequently being provided for, in particular superimposed on or added to, the input image. As a general definition of the low-frequency components, these can be understood to mean frequency components which have a lower spatial frequency than some frequency components occurring in the input image, e.g., smaller than 50% of the frequency components of the input image representable in a frequency distribution. Accordingly, a high-frequency component of an input image can be understood to mean frequency components with a higher frequency than the low-frequency components.

The representation of solidity refers to the impression of solid, i.e., three-dimensional, objects. In DIC images and the image calculations present here, this impression need not necessarily correspond to an actual three-dimensional sample structure shape. Rather, what is relevant is an easily comprehensible representation that a user is used to.

The image structures of an input image are non-random structures, which can be caused by the examined sample or a sample environment. By way of example, image structures can represent a plurality of biological cells within the input image. The image content refers to a plurality of or all image structures of an (input) image.

The added low-frequency components can be complemented depending on high-frequency components of the entire image or of the respectively locally corresponding image region. By way of example, it is possible to define low-frequency components, the contribution of which belongs to the image region of a certain image structure (e.g., one of a plurality of biological cells), on the basis of at least the high-frequency components of the same image region and optionally also on the basis of the high-frequency components of other image regions or of the entire input image. There is no need for an exclusive dependency on the high-frequency components; rather, the low-frequency components can also be determined on the basis of the entire frequency spectrum of the input image, which may also have only partly higher image frequencies than the low-frequency components.

In some embodiment variants there are separate steps for determining the low-frequency components and for the addition to the input image. Thus, the image processing algorithm can initially ascertain the low-frequency components for representing the solidity of image structures of the input image, on the basis of at least high-frequency components of these image structures. Subsequently, the ascertained low-frequency components are added to the input image in order to create the output image. Alternatively, these two steps can also be carried out by a single process. In particular, the image processing algorithm can be a program for image-to-image mapping, wherein parameters of this mapping may have been ascertained by a machine learning process. In this image-to-image mapping there is no need for an explicit output of low-frequency components; rather, the output image is calculated directly, wherein the difference (which need not necessarily be calculated explicitly or output) between output image and input image can correspond to the low-frequency components. In the case of a neural network, the low-frequency components can correspond to a layer which is precisely not the output layer of the neural network.

The steps of the image processing algorithm described here should not be understood to be a comprehensive listing of the work steps. Rather, the image processing algorithm can also carry out further steps as a matter of principle.

In this respect, the creation of the output image comprises an addition or superimposition of the low-frequency components on the input image, wherein, however, further computational operations may also be undertaken before the output image is produced. Contrast stretching or a brightness normalization can be carried out at the same time, for example. Particularly if the image processing algorithm is designed as a machine learning algorithm, such operations can be implemented within the scope of the same image-to-image mapping, as a common process with the described superimposition of low-frequency components.

Various variants of how a machine algorithm has been trained were described. Further invention variants are provided by carrying out the corresponding training steps.

A microscope system is understood to be an apparatus comprising at least a microscope and a computing device.

The computing device can be physically designed as part of the microscope or it can be arranged separately in the microscope surroundings. Alternatively, the computing device can also have a decentralized design and can communicate with the microscope by way of a data link. The microscope can be a light microscope in particular or, in general, any magnifying image recording appliance.

The optional features of the microscope system also yield variants of the method according to the invention when used as intended. Conversely, the microscope system can also be set up to carry out the described method variants.

BRIEF DESCRIPTION OF THE DRAWINGS

A better understanding of the invention and various other features and advantages of the present invention will become readily apparent by the following description in connection with the schematic drawings, which are shown by way of example only, and not limitation, wherein like reference numerals may refer to alike or substantially alike components.

DETAILED DESCRIPTION OF EXEMPLARY EMBODIMENTS

FIG. 1

Figure 1:
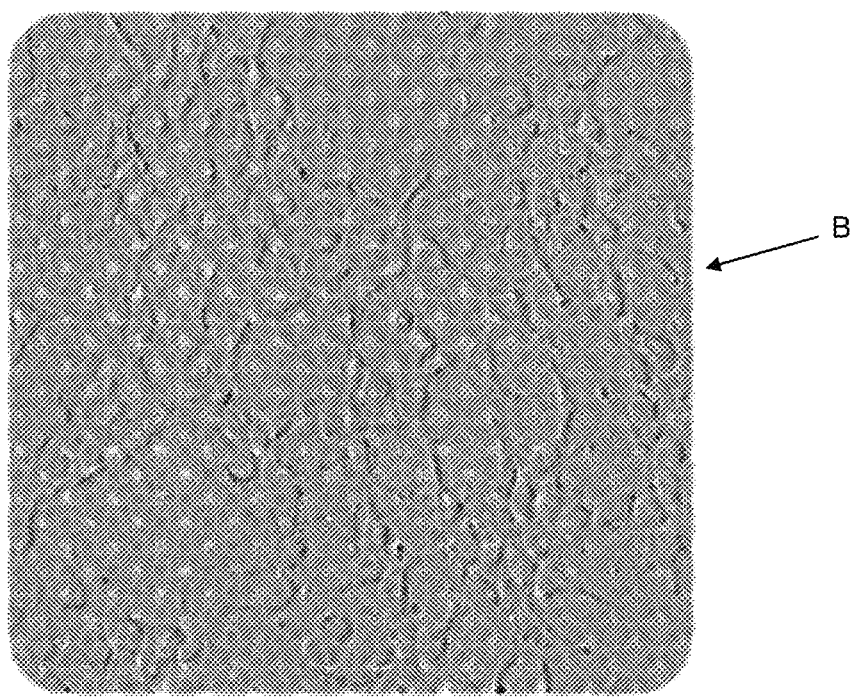
FIG. 1 schematically shows a microscope image and an output image, as can be calculated by the invention.
Figure 1:
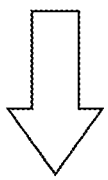
Figure 1:
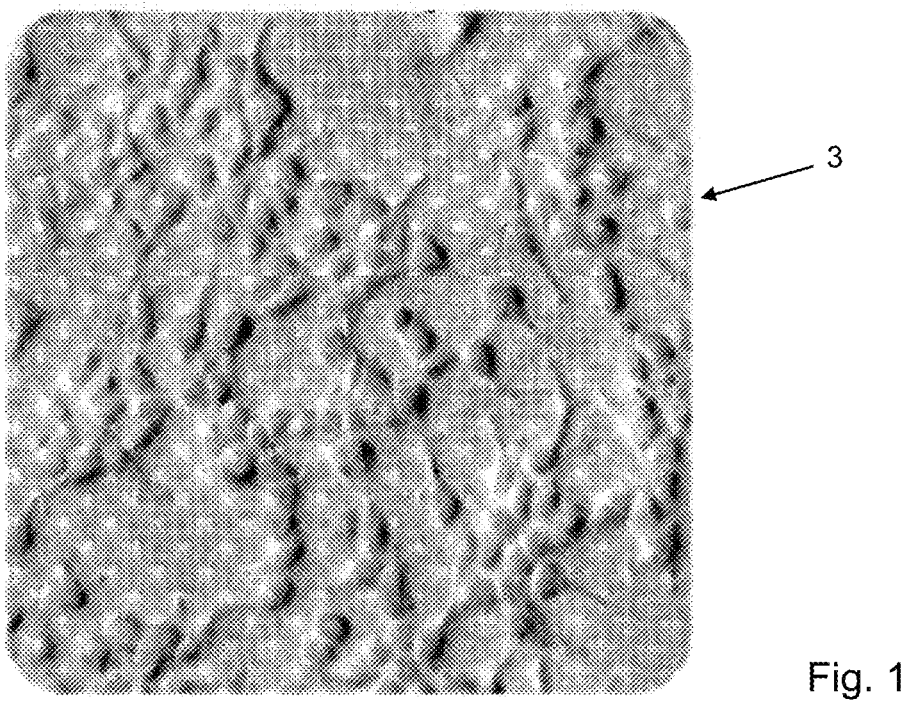

FIG. 1 shows a microscope image B, which is a contrast image in this example. Therein, changes in the phase of passing through light, which can be traced back to the sample, are represented by brightness differences.

FIG. 1 moreover shows an output image 3, as can be calculated from the microscope image B in exemplary fashion by the present invention. The output image 3 contains the image information of the microscope image B and differs from the latter by a solid impression. In this example, the image content comprises a plurality of biological cells. These image structures appear three-dimensional in the output image 3, as a result of which the visual evaluation is made easier for an observer in comparison with the original representation in the microscope image B.

In terms of solid impression, the output image 3 is similar to DIC images. In the latter, a spatial offset between interfering partial beams, which have experienced different phase changes, leads to brightened and shadowed regions at object edges. This yields a three-dimensional impression, which need not correspond to an actual 3D profile of the sample but serves for a quicker and easier perception and assessment by a microscope user.

Exemplary embodiments according to the invention, which can calculate the output image 3 from the microscope image B, are described with reference to the following figures. As an essential aspect of the invention, a falsification of the image content in the process is excluded. In particular, it is ensured that no new image structures, for instance new cells or cell details, are added as a result of the image processing. As a matter of principle, this problem exists in known machine learning algorithms, as specified in the introductory section relating to the prior art.

The invention exploits the discovery that the spatial impression of the output image 3 can be achieved by virtue of complementing the microscope image B with a superposition determined by low spatial frequencies. Higher spatial frequencies are, by contrast, decisively responsible for the relative position and course of the visible edges of the image structures, i.e., the cell edges. By virtue of adding no, or hardly any, higher frequency components, it is possible to avoid a falsification or an addition of image structures.

Figure 2:
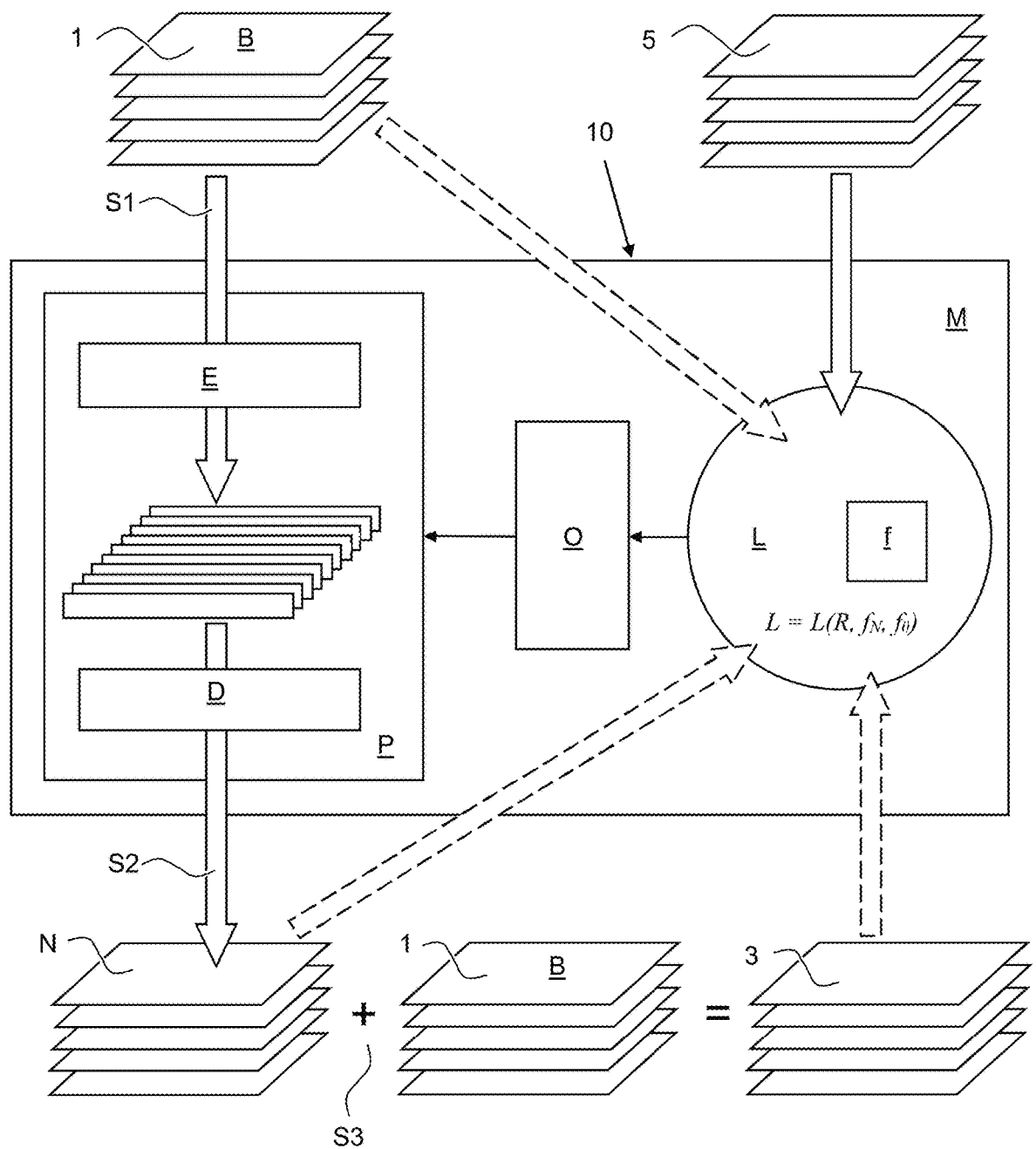
FIG. 2 illustrates an exemplary embodiment of a method according to the invention.

Exemplary Embodiment of FIG. 2

One exemplary embodiment of a method according to the invention will be described with reference to FIG. 2. The example should serve for better understanding. By contrast, in actual implementations, a plurality of steps can be carried out in computationally efficient fashion by way of a single operation or can be modified, as will also be explained below.

The example of FIG. 2 uses an image processing algorithm 10, which is based on a machine learning algorithm M. The processes of a learning procedure are illustrated. The training data are formed by a plurality of microscope images B, which are supplied as input images 1 to the machine learning algorithm M in step S1. An associated target image 5 is provided for each microscope image B of the training data. A microscope image B and an associated target image 5 could be images of the same sample region recorded using different microscopy techniques. By way of example, the target images 5 could be DIC images while the microscope images B are DPC images.

The machine learning algorithm M comprises a neural network P, which is formed by an encoder-decoder structure in this case. From an input microscope image B, the encoder E produces a feature vector which, in principle, could have any dimensions. The feature vector is an input for the decoder D which outputs an image therewith in step S2. The latter should be formed from low spatial frequencies and is therefore referred to as low-frequency components N. The low-frequency components N are added to the input image 1 in step S3, as a result of which the output image 3 is produced. Once the machine learning algorithm has been taught, the output image 3 corresponds to the output image 3 shown in FIG. 1.

To make things clear, it is noted that the processes can be carried out in the spatial domain, in the frequency domain or partly in the spatial and partly in the frequency domain. In the spatial domain, the images (i.e., the input image 1, the output image 3 and the low-frequency components N) are each representable as a 2D matrix of brightness values. By way of a frequency transformation, for example a Fourier transform, the representation in the spatial domain is able to be converted into a representation in the frequency domain. In modifications of the illustrated embodiment, the frequency transforms of the microscope images B can also be supplied to the machine learning algorithm as input images (which are now representations in the frequency domain). Likewise, or alternatively, the low-frequency components N, which are calculated for an input image 1, can be output in the frequency domain and can only be added to the associated input image 1 following a transformation into the spatial domain.

During the learning procedure, the calculated output images 3 are supplied to a loss function L. The loss function L calculates a measure of a correspondence between an output image 3 and an associated target image 5, which both belong to the same input image 1. This measure can also be considered to be a penalty number as its size increases, the smaller the correspondences are between the output image 3 and the target image 5. Conventional loss functions L calculate a deviation or distance R between the pixels, for example by means of a sum of the square deviations between locally corresponding pixels in output image 3 and target image 5. However, the loss function L of the exemplary embodiment according to the invention is not only a function of such a distance R. Rather, the loss function L is also dependent on the frequency values f of the added low-frequency components N, specified schematically in FIG. 2 as $f_N$. The higher $f_N$, the higher the value (the penalty number) of the loss function L. By way of example, the low-frequency components N can comprise different frequencies with a different amplitude in each case. These various frequencies, weighted by their respective amplitude, can now be incorporated in summed fashion in the loss function L. The loss function L is therefore not only a measure for how well a calculated output image 3 corresponds to an associated target image 5 but also a measure for whether low or high spatial frequencies were added in the calculation of the output image 3. The frequency dependence in the loss function can be expressed by a parameter $f_0$, which can represent a spatial frequency limit. More penalty points are awarded to added frequency components $f_N$ above the spatial frequency limit $f_0$ than to added frequency components $f_N$ below the spatial frequency limit $f_0$. Optionally, penalty points can be higher, the more added frequencies $f_N$ exceed the spatial frequency limit $f_0$.

The spatial frequency limit $f_0$ can be a specified constant or a variable in the loss function. By way of example, the variable can depend on context information, for example an illumination aperture for an input image.

From the result of the loss function L, an optimization function O calculates how parameters/weights to be learnt of the neural network P should be altered. Updated low-frequency components N are calculated using the updated parameter values and the described steps are repeated until parameters that minimize the loss function L have been ascertained.

As inputs, the loss function L need not necessarily obtain the output images 3, the low-frequency components N and the input images 1; rather, two of these three are enough, as indicated by the dashed arrows.

A summation in step S3 is shown as a simple example of a superimposition of the low-frequency components N on the input images 1. However, other calculation operations can also be used to combine the low-frequency components N and the input image 1.

In all present descriptions, the loss function L can also be replaced by a reward function which, in contrast to the loss function L, should be maximized. In the reward function, the dependencies in relation to frequency $f_N$, the spatial frequency limit $f_0$ and the deviations R are reversed, i.e., the reward function increases with smaller deviations R, lower added frequencies $f_N$ and when $f_0$ is undershot.

The neural network P can also be formed differently than by an encoder-decoder model.

A further modification is described below with reference to FIG. 3.

Figure 3:
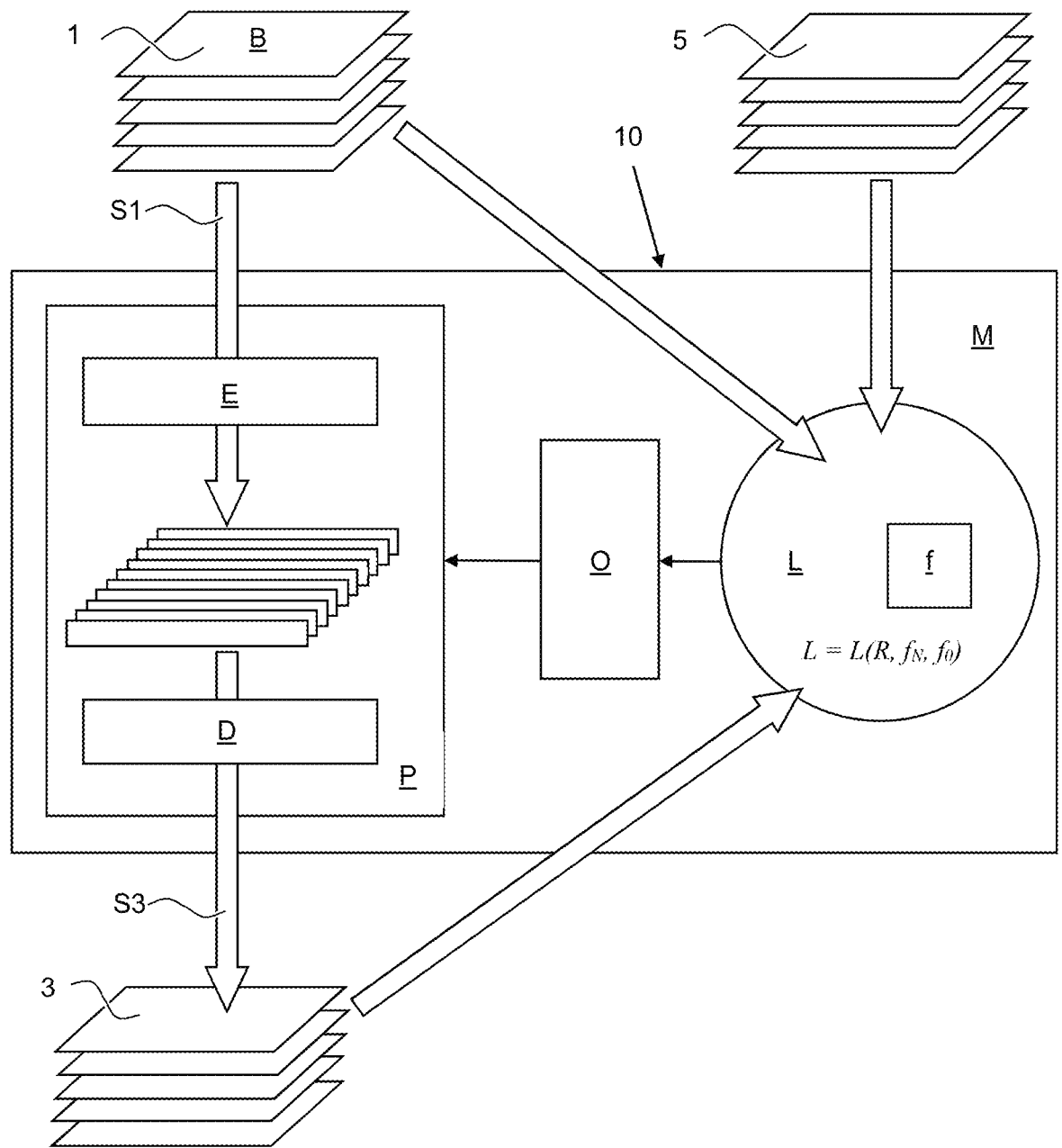
FIG. 3 illustrates a further exemplary embodiment of a method according to the invention.

Exemplary Embodiment of FIG. 3

FIG. 3 illustrates an exemplary embodiment of a method according to the invention, which differs from FIG. 2 in that the neural network P calculates an output image 3 directly from an input image 1, as labelled as step S3. Thus, the neural network P need not necessarily explicitly calculate or output the low-frequency components N in this case.

An exemplary design of the neural network P comprises a residual skip structure: Here, the low-frequency components N are initially calculated in a manner analogous to FIG. 2, wherein both the low-frequency components N and the input image 1 are input in a subsequent layer of the neural network. The input image 1 consequently skips layers of the neural network P.

In the loss function L, the implicitly added low-frequency components N can be reconstructed by a comparison of the input image 1 with the associated output image 3.

Figure 4:
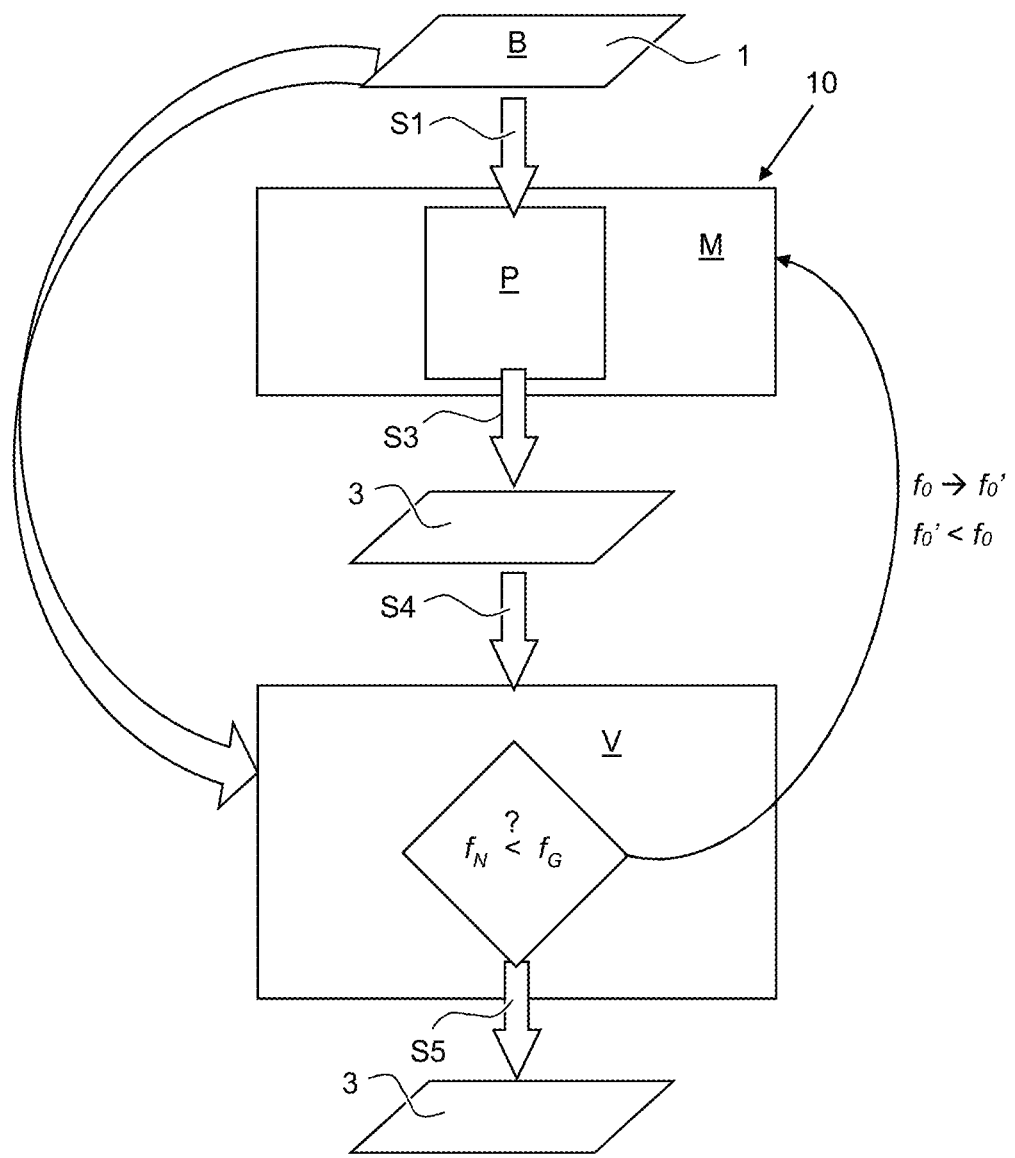
FIG. 4 illustrates yet a further exemplary embodiment of a method according to the invention.

Exemplary Embodiment of FIG. 4

FIG. 4 illustrates the progress of an exemplary method of the invention for processing a microscope image B. While the preceding figures represented the training procedure, FIG. 4 shows the use of the already trained image processing algorithm 10.

The already trained machine learning algorithm M can be restricted to the neural network P as described in the previous figures, wherein the functionalities for training the neural network P, i.e., for defining the weights thereof, are not required here.

In step S1, a microscope image B is supplied as input image 1 to the image processing algorithm 10, which calculates an output image 3 therefrom in step S3, as also shown in FIG. 1 and described above in respect of the training procedure.

In FIG. 4, there now is an optional verification procedure which is intended to ensure that no image processing artefacts were added to the input image 1. Such a safety step is particularly expedient if the image processing algorithm 10 is based on a machine learning algorithm.

In step S4, the output image 3 is supplied to a verification algorithm V. The latter compares the output image 3 to the input image 1 and assesses a frequency distribution of the differences between these images. These differences, i.e., the frequencies $f_N$ of the added low-frequency components, can be compared, for example, to a specified value of a frequency upper limit $f_G$. For this comparison, use can be made of a variable derived or accumulated from the low-frequency components $f_N$, for example the mean thereof.

If $f_N$ is less than $f_G$, it was possible to ensure that no high-frequency components were added which could falsify or remove the image structures of the input image 1 or could lead to a "hallucination" of newly added structures. The image processing is therefore assessed as correct and the output image 3 is output in step S5.

By contrast, if $f_N$ is greater than $f_G$, the verification algorithm V assesses the output image 3 as potentially falsified and prompts renewed image processing by the image processing algorithm 10. In the process, an image processing parameter is altered in order to suppress an addition of higher-frequency image components. By way of example, the machine learning algorithm M shown in FIG. 2 or 3 could be trained in advance with different values of the parameter $f_0$ in a plurality of training iterations. As a result, different loss functions L are used, which differ in the frequencies above which penalty points are awarded or in how strongly an award of penalty points increases with increasing frequency of the added components N. As a result, a plurality of neural networks P are ascertained, which differ in terms of the underlying parameter $f_0$. If the verification algorithm V in FIG. 4 now prompts renewed image processing, the parameter value $f_0$ is altered to a smaller value $f_0'$ in the process and the correspondingly associated neural network P is selected. This reduces the probability of image processing artefacts reappearing in the output image 3.

The verification algorithm V can optionally likewise be formed using a machine learning algorithm.

Figure 5:
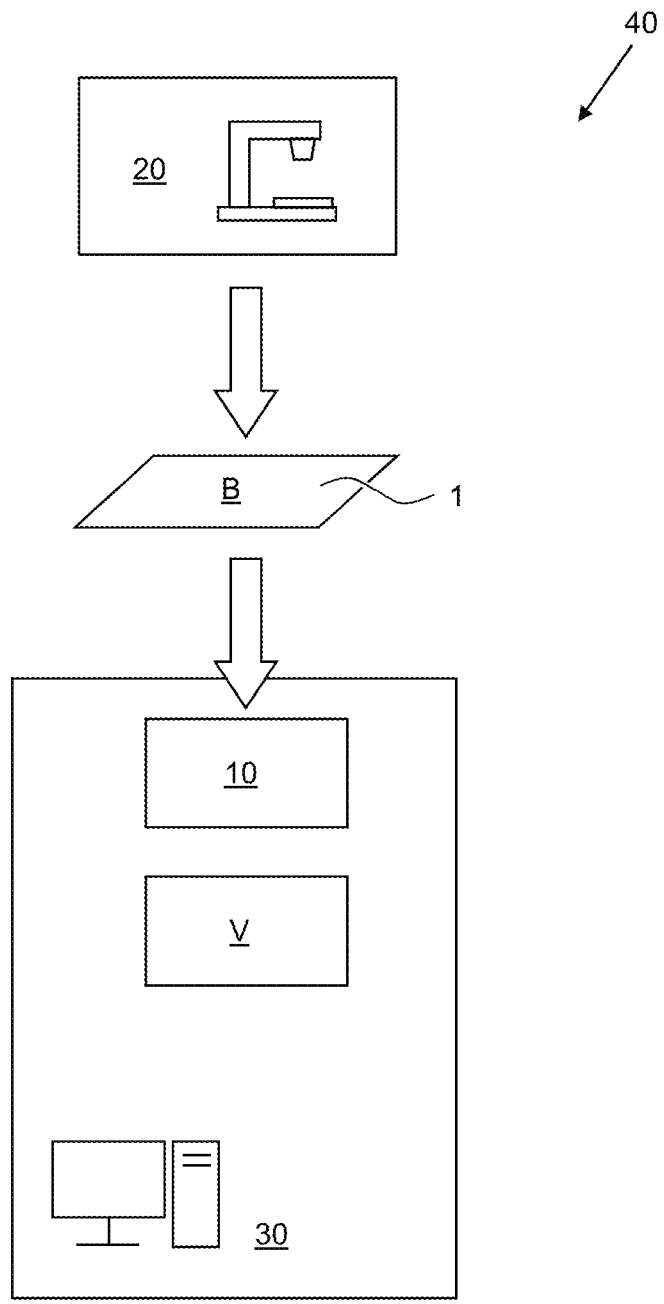
FIG. 5 schematically shows an exemplary embodiment of a microscope system according to the invention.

Exemplary Embodiment of FIG. 5

FIG. 5 schematically shows an exemplary embodiment of a microscope system 40 according to the invention. The microscope system 40 comprises a (light) microscope 20, by means of which at least one microscope image B is recorded. The latter is supplied to the image processing algorithm 10 and, optionally, to the verification algorithm V.

The image processing algorithm 10 and the optional verification algorithm V are formed as a computer program. Exemplary embodiments of the computer program according to the invention are given by the above-described exemplary designs of the image processing algorithm 10 and of the verification algorithm V.

The microscope system 40 of FIG. 5 comprises a computing device 30 which is set up to carry out the computer program, i.e., the image processing algorithm 10 and the verification algorithm V. By way of example, the computing device 30 can be a server-based computer system or a (personal) computer. Here, the machine learning algorithm can be trained, in particular, using a graphics processor (GPU) of the computing device 30.

By way of the various exemplary embodiments explained, an output image that a user finds optically easier to comprehend can be calculated from an input image by virtue of a solid impression being generated without there being a risk of falsifying relevant sample structures. The exemplary embodiments described are purely illustrative and modifications thereof are possible within the scope of the attached claims.

LIST OF REFERENCE SIGNS

B Microscope image
D Decoder
E Encoder
f Spatial frequency of the image components to be added
$f_0$ Spatial frequency limit
$f_G$ Frequency upper limit
$f_N$ Frequency values
L Loss function
M Machine learning algorithm
N Low-frequency components which should be added to an input image
O Optimization function
P Neural network
R Term in the loss function specifying the deviation between output image and target image
S1 Inputting a microscope image as input image into an image processing algorithm
S2 Calculating and outputting a low-frequency component which should be added to the input image
S3 Creating an output image by adding a low-frequency component to the input image
S4 Supplying the output image to a verification algorithm
S5 Outputting the output image by the verification algorithm
V Verification algorithm
1 Input image
3 Output image
5 Target image
10 Image processing algorithm
20 Microscope
30 Computing device
40 Microscope system

We claim:

1. A method for processing microscope images, comprising:
inputting at least one microscope image as input image into an image processing algorithm;
creating an output image from the input image by means of the image processing algorithm,
wherein creating the output image comprises adding low-frequency components for representing solidity of image structures of the input image to the input image,
wherein the low-frequency components at least depend on high-frequency components of these image structures and wherein high-frequency components are defined by a higher spatial frequency than low-frequency components.

2. The method as defined in claim 1,
wherein the image processing algorithm comprises a machine learning algorithm which is trained to add the low-frequency components to the input image.

3. The method as defined in claim 2,
wherein the machine learning algorithm comprises a neural network with an encoder-decoder structure, the decoder of which ascertains the low-frequency components which are added to the input image.

4. The method as defined in claim 2,
wherein the machine learning algorithm is trained with a loss function, which not only considers deviations between output images calculated from training data and associated target images but also penalizes or prevents an addition of spatial frequency components with increasing spatial frequency or above a spatial frequency limit.

5. The method as defined in claim 4,
wherein said spatial frequency limit or a spatial frequency dependence of the aforementioned addition of spatial frequency components is defined in the loss function in dependence of an image content of the input image.

6. The method as defined in claim 4,
wherein the image processing algorithm produces the output image in a first work step and supplies the output image to a verification algorithm in a second work step,
wherein the verification algorithm assesses the output image in respect of image processing artefacts,
wherein, depending on an assessment result, the first work step is repeated for producing a new output image, with the stipulation that the spatial frequency limit or the spatial frequency upper limit is reduced, and the second work step is subsequently carried out in relation to the new output image.

7. The method as defined in claim 6,
wherein the verification algorithm compares the output image to the input image and assesses whether the added low-frequency components observe a predetermined frequency upper limit.

8. The method as defined in claim 6,
wherein the verification algorithm comprises a machine learning verification algorithm which is trained using training data which comprise input images and associated output images created by the image processing algorithm.

9. The method as defined in claim 2,
wherein training of the machine learning algorithm is carried out, within the scope of which microscope images are used as input images and differential interference contrast images spatially registered to the microscope images are used as target images.

10. The method as defined in claim 1,
wherein the image processing algorithm defines a spatial frequency upper limit on the basis of an image content or a frequency distribution of the input image, and
wherein the image processing algorithm only adds low-frequency components that lie below the spatial frequency upper limit to the input image.

11. The method as defined in claim 1,
wherein the image processing algorithm adds the low-frequency components to the input image and wherein the low-frequency components do not represent an amplification or multiplication of low-frequency components already present in the input image.

12. The method as defined in claim 1,
wherein the low-frequency components to be added are defined on the basis of context information relating to the microscope image.

13. Computer program comprising commands stored on a non-transitory computer-readable medium which, upon execution by a computer, prompt the method as defined in claim 1 to be carried out.

14. A microscope system, comprising:
a microscope for recording a microscope image; and
a computing device configured to carry out an image processing algorithm, wherein the image processing algorithm creates an output image from the microscope image as input image, wherein the creation of the output image comprises adding low-frequency components for representing solidity of image structures of the input image to the input image, wherein the low-frequency components at least depend on high-frequency components of these image structures and wherein high-frequency components are defined by a higher spatial frequency than low-frequency components.

* * * * *